United States Patent
Hecox et al.

(10) Patent No.: US 9,026,856 B2
(45) Date of Patent: May 5, 2015

(54) PREDICTING SYMPTOMS OF RUN-TIME PROBLEMS IN VIEW OF ANALYSIS OF EXPERT DECISION MAKING

(75) Inventors: Andrew Hecox, Raleigh, NC (US); Gavin Romig-Koch, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 182 days.

(21) Appl. No.: 13/605,018

(22) Filed: Sep. 6, 2012

(65) Prior Publication Data

US 2014/0068330 A1     Mar. 6, 2014

(51) Int. Cl.
   *G06F 11/00*     (2006.01)
   *G06F 11/07*     (2006.01)
   *H04L 12/24*     (2006.01)

(52) U.S. Cl.
   CPC ........ *G06F 11/0793* (2013.01); *G06F 11/0706* (2013.01); *G06F 11/079* (2013.01); *H04L 41/5061* (2013.01)

(58) Field of Classification Search
   CPC .............................. G06F 11/34; G06F 9/4446
   See application file for complete search history.

(56) References Cited

U.S. PATENT DOCUMENTS

| | | | |
|---|---|---|---|
| 7,861,120 B2 * | 12/2010 | Cui | 714/38.1 |
| 8,065,315 B2 * | 11/2011 | Rapp et al. | 707/759 |
| 8,521,675 B2 * | 8/2013 | Boyle et al. | 706/45 |
| 2008/0162688 A1 * | 7/2008 | Reumann et al. | 709/224 |
| 2008/0263404 A1 * | 10/2008 | Vidiyala | 714/38 |
| 2009/0158099 A1 * | 6/2009 | Cui | 714/57 |
| 2010/0057677 A1 * | 3/2010 | Rapp et al. | 707/3 |
| 2012/0066218 A1 * | 3/2012 | Rapp et al. | 707/723 |
| 2013/0097179 A1 * | 4/2013 | Moshrefi et al. | 707/748 |
| 2013/0117267 A1 * | 5/2013 | Buryak et al. | 707/737 |
| 2013/0185592 A1 * | 7/2013 | Fleming et al. | 714/37 |

* cited by examiner

*Primary Examiner* — Christopher McCarthy
(74) *Attorney, Agent, or Firm* — Lowenstein Sandler LLP

(57) ABSTRACT

Systems, methods, and non-transitory computer-readable storage media for receiving historical data describing behavior of human subject-matter experts, wherein the historical data links customer problems with solutions, receiving a plurality of human-generated algorithms describing patterns for linking customer problems with solutions based on problem-specific diagnostic data, comparing each algorithm of the plurality of algorithms with the historical data to determine respective predictive scores for linking a customer problem type with a particular solution, and ranking at least part of the plurality of algorithms based on the respective similarity scores.

18 Claims, 6 Drawing Sheets

PREDICTING SYMPTOMS OF RUN-TIME PROBLEMS IN VIEW OF ANALYSIS OF EXPERT DECISION MAKING

TECHNICAL FIELD

Embodiments of the present invention relate to resolution of problems, and more specifically to basing problem resolution on algorithms which match a current problem to historical data of human expert actions in solving similar problems.

BACKGROUND

Many organizations which distribute software, particularly commercial software vendors but also non-commercial software distributors, offer support services for customers or users of the software. Two traditional ways of offering support services are on-site support and telephone based technical support. However, these traditional avenues for providing support to users can often be expensive for the vendor, time-consuming for both the vendor and customer, and uncomfortable or inconvenient for the customer. Further, multiple users often encounter the same or similar problems with a particular software product. One way a software distributor can resolve these repetitive or commonly occurring problems is to make available a data store of solutions, such as a knowledge base. However, this solution is not always optimal, because a user may not know about the knowledge base, the user may not know how to effectively use the knowledge base, or may not have sufficient information by which to search the knowledge base.

Another way to resolve such customer problems is to train a sufficient number of human experts who provide personalized support for customer problems. However, human support experts are expensive, have different skill levels, and can require a significant investment in time to train. Further, human-provided support does not scale well, in that a call center, for example, encounters difficulty in meeting a need for significant additional capacity on short notice while still maintaining high quality of service.

BRIEF DESCRIPTION OF THE DRAWINGS

The present invention is illustrated by way of example, and not by way of limitation, in the figures of the accompanying drawings and in which.

DETAILED DESCRIPTION

Figure 1:
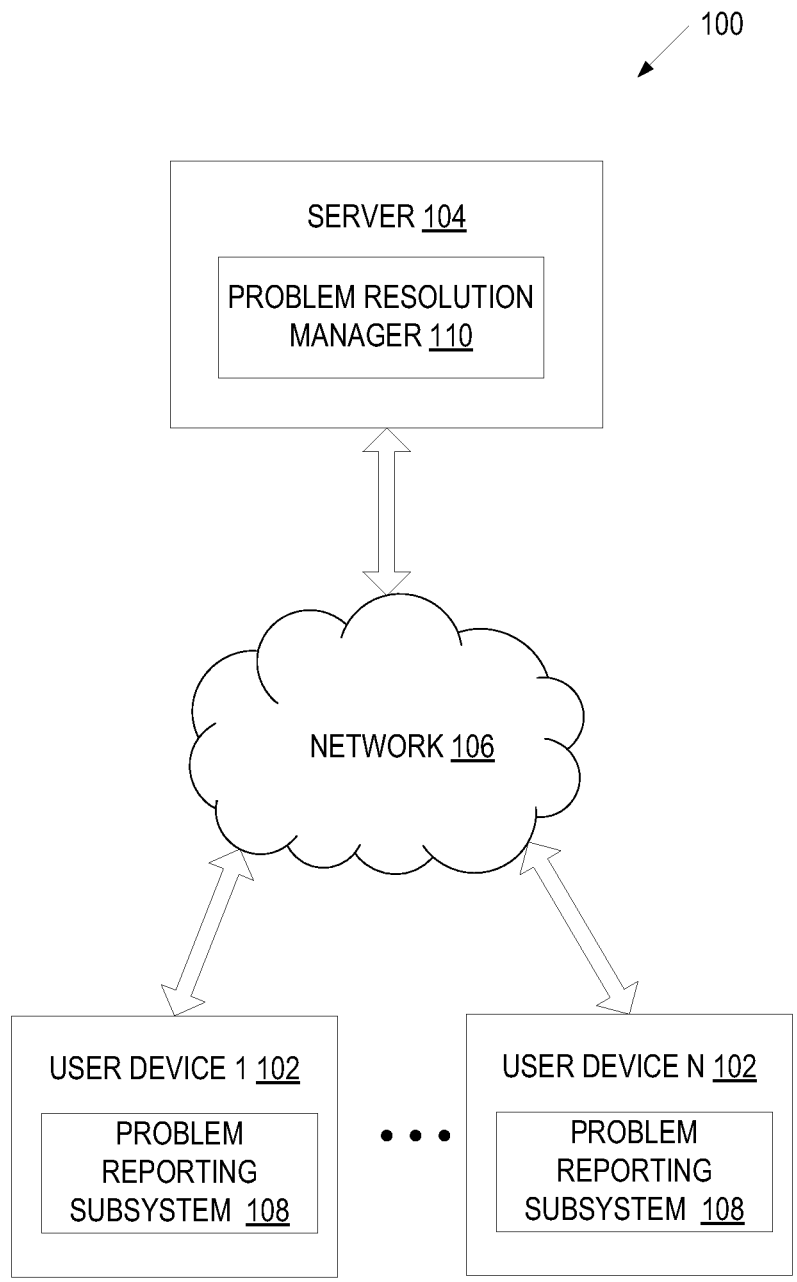
FIG. 1 illustrates a block diagram of an exemplary computer architecture including a component for predicting symptoms of run-time problems based on analysis of expert decision making, according to an embodiment of the present invention.

Described herein is a system, a method and apparatus for resolving and/or assisting users in resolving problems. One common embodiment involves software problems, such as an error during installation of a software application or package, or a problem while using software. In one embodiment, when a software application encounters an error, a problem reporting subsystem assembles diagnostic data describing the error, the state of the software application leading up to the error, and any other data relevant to the error, and transmits the diagnostic data to a problem resolution manager. The problem resolution manager applies the diagnostic data to the facts of a particular scenario, and identifies an algorithm that is likely to be the most predictive for that scenario in order to resolve the problem.

The problem resolution manager selects a solution, or a meta description of a problem class and a solution to that problem class if known. The problem resolution manager can use historical data about linking behavior of human subject matter experts to predict which cases are likely to link to a solution corresponding to the problem, and can provide all or part of that solution or a link to the solution either to support technicians, end-users, or to the software application on the end-user's device.

Specifically, the problem resolution manager can utilize a number of algorithms which evaluate the diagnostic data associated with a particular customer case. The problem resolution manager measures each algorithm's result against the known behavior of experts, which is ranked on its ability to predict the link results which would have been chosen by reviewing diagnostic data on closed cases and evaluating the effectiveness of multiple algorithms to predict which solutions will be associated with the closed case. Solutions can be documents, a list of steps, knowledge base articles, web pages, instructions, a software utility, an explanation, and so forth. The problem resolution manager can use these ratings of the algorithms to provide a ranked list of solutions to the problems described in a customer case and represented by the diagnostic data. In this way, the problem resolution manager can quickly and efficiently locate likely solutions to problems, in a way that is trained from the successful behavior of experts in resolving similar problems. Further, the problem resolution manager can automate linking cases to existing solutions, thereby substantially reducing the time between the initial contact from a customer with a problem and implementing a solution to that problem.

The problem resolution manager, as guided by the algorithms and their respective predictive abilities, mimics observable behavior by humans who have solved problems manually or would have solved problems manually. The problem resolution manager can expedite resolution of the problem, or can even solve all or part of the problem for the user without interaction, or with reduced interaction, with a human support engineer.

FIG. 1 is a block diagram of exemplary problem resolution system 100 according to embodiments of the invention. The problem resolution system 100 includes a server 104 executing a problem resolution manager 110 configured to manage incoming problems from one or more user devices 108. The server 104 may be hosted by one or more computing devices including, for example, a server computer, a desktop computer, and the like.

As shown in FIG. 1, the problem resolution manager 110 is communicatively connected to multiple user devices 102 (e.g., user device 1, user device 2, . . . user device N) via a network 106, such as the Internet, an intranet, or other network(s). Each user device has a problem reporting system 108. One having ordinary skill in the art will appreciate that the associations between the connections and the subsystems shown in FIG. 1 are presently merely for illustration purposes, and that the connections are not necessarily dedicated to particular user devices 102. Further, each user device 102 may not have a direct network connection to the server 104 at all times, and may only connect when the user device 102 has a problem to report, on some periodic basis, or upon the occurrence of some other event.

The problem resolution manager 110 may be any software program, process, thread, or daemon executable by the server 104 to process information received from one or more problem reporting subsystems 108. One having ordinary skill in the art will appreciate that the server 104 may be multiple computing devices communicatively connected and configured to execute and manage the modules and devices shown in FIG. 1.

The user devices 102 execute certain programs or perform other actions. As the user devices 102 encounter errors or other problems, the problem reporting subsystem 108 gathers information about those errors, and sends that information, via the network 106, to the server 104 and the problem resolution manager 110. The problem resolution manager 110 can identify a problem from the information, and select a likely resolution. Then the problem resolution manager 110 can implement the resolution, provide that information back to the appropriate user device 102, or provide that information to a human support agent who can assist a user of the user device 102.

The user devices can be any type of computing device such as, for example, a desktop computer, a portable digital assistant, a mobile phone, a laptop computer, a portable media player, a tablet computer, a netbook, a notebook, a personal computer, a point of sale device, a handheld device, and so forth.

In an embodiment, the problem resolution manager 110 is coupled to a central processing unit (CPU) and memory of the server 104. The memory may be configured to store instructions or a software package for the problem resolution manager, the problem reporting subsystem, the diagnostic data, the problem resolution algorithms, and so forth. In an embodiment, the problem resolution manager 110 is configured to receive problem diagnostic data from a problem reporting subsystem 108 through the user device 102, and transmit to the user device 102 a resolution to the problem.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "monitoring", "determining", "selecting", "migrating", "deploying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Figure 2:
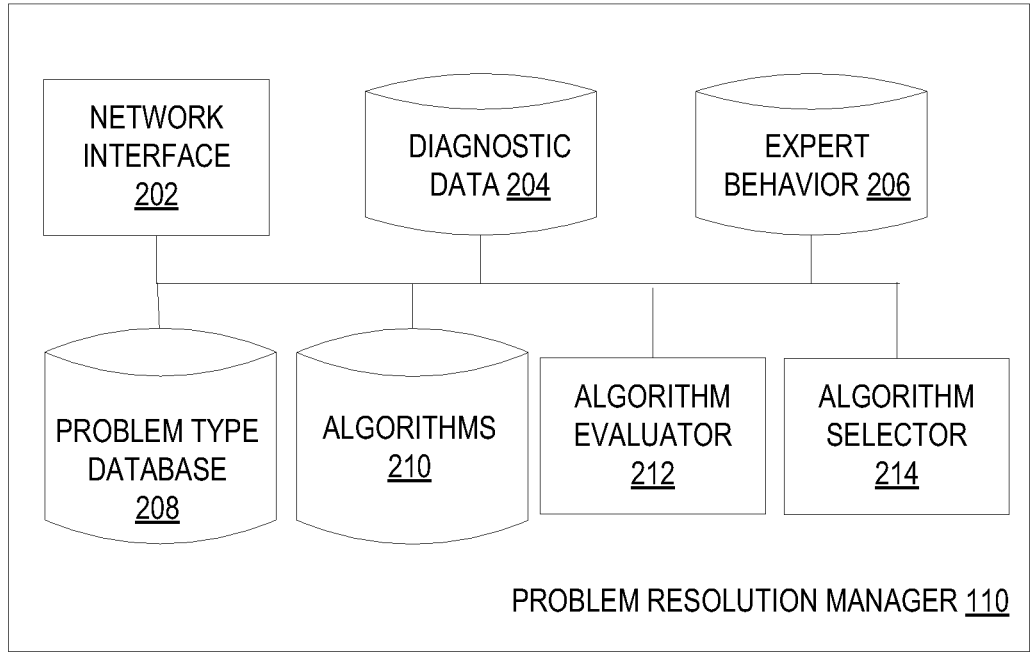
FIG. 2 illustrates a block diagram of an example problem resolution manager.

FIG. 2 illustrates a block diagram of an example problem resolution manager 110. The problem resolution manager 110 may include an algorithm evaluator 212 that selects or identifies algorithms, measures, ranks, and/or tunes the algorithms, based on observed behavior of human problem resolution experts, to identify the predictive ability of the algorithms in selecting a successful solution to a particular problem. The problem resolution manager 110 may also include an algorithm selector 214 that selects an algorithm for a specific problem and applies those algorithms to provide a top solution or an N-best ranked list of likely solutions.

The problem resolution manager 110 can optionally include a network interface 202 for communicating with the problem reporting system 108 or other entities. Alternatively, the problem resolution manager 110 can rely on the network communication abilities of an underlying operating system for communications. The problem resolution manager 110 can include a data store of diagnostic data 204 from previously encountered problems. The problem resolution manager 110 can include a data store of expert behavior 206 describing how experts handled the previously encountered problems. The problem resolution manager 110 can include a data store of problem types 208, and a data store of algorithms 210 and their associated effectiveness in predicting how a human expert would link a solution to a particular problem. Data stores 204, 204, 208 and 210 may represent individual data structures or combined data structures (tables, data stores, repositories, files, etc.) residing on one or more mass storage devices, such as magnetic or optical storage based disks, solid-state drives or hard drives.

In one embodiment, the algorithm selector 214 identifies algorithms 210 that may match structured diagnostic data 204 between two problem instances and use the identified algorithms to guess or predict a resolution based on historical expert behavior 206. The algorithm selector 214 can perform multiple passes.

The diagnostic data 204 can be structured or unstructured, but is described herein as structured for the sake of simplicity. Some examples of structured diagnostic data 204 are output from a debugging tool and a stack trace. A stack trace can be a report of the active stack frames at a certain point in time during the execution of a program, which can be useful for troubleshooting a program problem after a crash. Examples of unstructured diagnostic data 204 include a history of user inputs and simple log messages. The problem resolution manager 110 can use other types of diagnostic data 204, but highly structured diagnostic data such as a stack trace is a commonly available and highly informative for many applications. While a program stack trace is the canonical example of diagnostic data, other well-defined types of diagnostic information collected by an operating system, application, or programming language can be used as well. Historical expert behavior data 206 can be a collection of stack traces extracted out of a large corpus of customer problem information. The historical expert behavior data 206 can be partial.

The algorithm evaluator 212 can sort or rank algorithms into groups, such as groups of algorithms that are highly predictive of correct resolutions, groups of algorithms that are only modestly predictive of correct resolutions, and groups of algorithms that are rarely or never predictive of correct resolutions. The rankings or groupings can be based on the algorithms' ability to predict what an expert would have done historically, such as based on expert behavior 206. The algorithm evaluator 212 can rank or group algorithms as part of an initial training period, periodically, and/or dynamically as new data describing expert behavior becomes available. The algorithm evaluator 212 can determine when to re-rank the algorithms based on new historical data, or based on feedback from the support process, a support engineer, or a developer, for example. In one embodiment, when the algorithm selector 214 provides a bad recommendation that does not resolve the customer's problem, a feedback mechanism can examine why or can flag the case for human review. The feedback mechanism can also revise the predictive power of the algorithm that provided the incorrect resolution for that problem.

Many interactions or problem types have well-defined problem signatures, or clues that an algorithm can use to identify a likely solution. The algorithm evaluator 212 can select algorithms that correctly pick up on these problem signatures based on user behavior and/or expert behavior. In one example, multiple experts define various algorithms representing their thought process or troubleshooting approach for one or more problems or problem types. Then the algorithm evaluator 212 analyzes the algorithms, after a human defines them, by applying the algorithms to the corpus of expert behavior 206 to determine which algorithms are most predictive. The algorithm evaluator 212 can sort the algorithms based on the predictive ranking. These algorithms can be tailored for a very specific problem type, or can be general purpose or multi-purpose. The algorithm evaluator 212 can vary the ranking mechanism based on the type of historical expert behavior and/or the problem type. Thus, the same set of algorithms may be ranked differently or may have a different order of preference for different problem types.

The data store of algorithms 210 can be populated by human-generated algorithms which can be updated or adjusted. A human expert, such as a technical support technician or a compiler engineer can use their common sense when designing an algorithm, but even experimental algorithms can be useful. While an experienced human expert may have a good intuition of which algorithms are likely to be effective, ultimately the predictive power of an algorithm determines how algorithms are ranked. The problem resolution manager 110 can use different algorithms for different problem types. For example, algorithm B may accurately predict correct linking behavior of an expert 95% of the time for problem type X, and only 30% of the time for problem type Y, while algorithm C may accurately predict correct linking behavior of an expert 5% of the time for problem type X, and 70% of the time for problem type Y. Thus, the algorithm data store can be coupled to or linked to entries in the problem type data store 208. While these different data stores are depicted as separate, they can be incorporated as part of the same data store.

Further, the problem resolution manager 110 can include all or some of these components. For example, after an initial setup phase for training and evaluating the algorithms, the problem resolution manager 110 may be able to function without the diagnostic data 204 and some of the expert behavior 206. However, in a problem resolution manager 110 that improves the ranking of algorithms based on incoming data, the inclusion of these components may be beneficial in maintaining a history of diagnostic data and adjusting the algorithms, the problem type data store, and/or other components accordingly.

Figure 3:
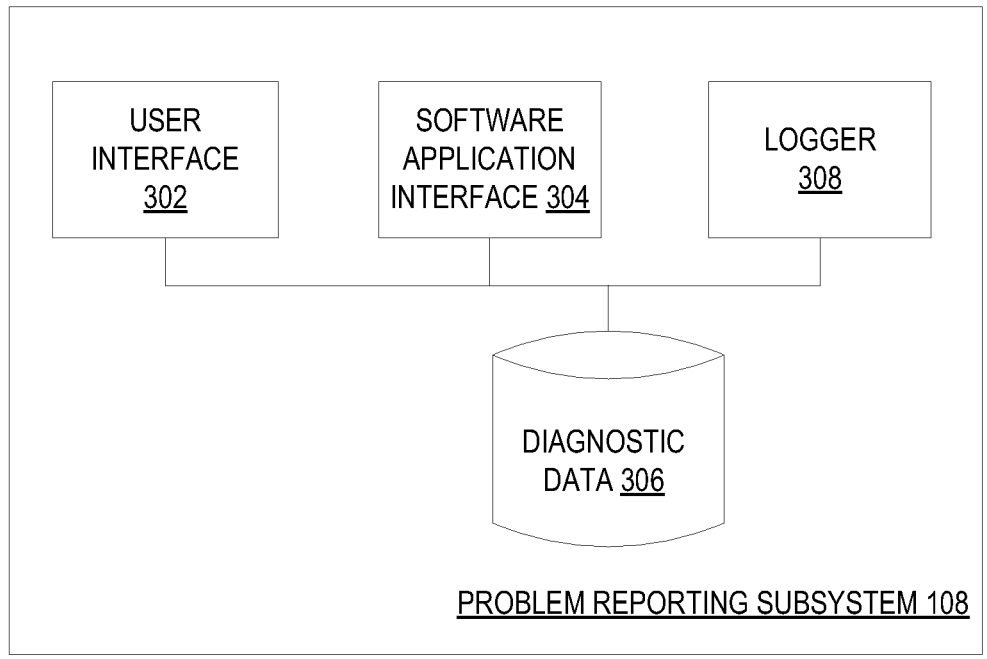
FIG. 3 illustrates a block diagram of an example problem reporting subsystem.

FIG. 3 illustrates a block diagram of an example problem reporting subsystem 108. The problem reporting subsystem 108 can include software and/or hardware components. The problem reporting subsystem 108 can include a user interface 302 for allowing a local or remote user or administrator to view or manage any of the components of the problem reporting subsystem 108. The problem reporting subsystem 108 includes a software application interface 304 that interacts with one or more software applications for monitoring for errors or problem conditions. The problem reporting subsystem 108 can be incorporated as part of the software application(s) being monitored or can be a separate component. As the software application interface 304 gathers information, it records information via a logger 308. When an error condition is encountered, the problem reporting subsystem 108 records information describing the error condition as diagnostic data 306. The problem reporting subsystem 108 sends the diagnostic data to the problem resolution manager 110. The problem resolution manager 110 can then send a response to the problem reporting subsystem 108, to a support technician, to a user, and/or to some other component associated with the problem or with resolving the problem.

In one example usage scenario regarding a software installer, the diagnostic data 204 is a corpus of historical information describing problems with a particular software application or class of software applications. From that corpus, the problem resolution manager 110 can find key diagnostic information, like a stack trace, that can be used to compare problems across multiple instances. When a new customer or a new runtime problem is encountered, the problem reporting subsystem 108 of that customer can submit a stack trace associated with that problem to the problem resolution manager 110. The problem resolution manager 110 compares the relevant data in the stack trace to historical diagnostic data 204 from previous instances of stack traces or problems associated with that particular product. Based on the predictivity of the algorithms, the problem resolution manager 110 uses a problem type 208 and an algorithm 210 which generate or select a likely resolution. The problem resolution manager 110 can communicate the likely resolution directly to the user's device, which can display to the user a message "Here's a KB article that will resolve this issue for you" or "This is a problem with the hardware you're running and this version of the installer. You need to get a newer version of the installer." The problem resolution manager 110 provides a likely answer to that particular problem, and if that likely answer is correct, the user's problem can be resolved almost immediately.

The problem resolution manager 110 can store information associated with the user's problem, as well as any received result from the user's actions after reporting the problem, in the diagnostic data 204 data store. For example, new diagnostic data can provide feedback, illustrate edge cases of problems that the algorithms did not adequately anticipate, statistical information describing a frequency of certain problems, and so forth.

The problem resolution manager 110 can sort or filter diagnostic data for a particular software application by version number or by range of version numbers. However, the problem resolution manager 110 may alternately bias results rather than filter results. For example, the problem resolution manager 110 can rely on structured metadata about knowledge base articles that indicate a particular problem in versions 5 and 6. Sometimes all or part of a known problem can cross between software versions, so the problem resolution manager 110 can avoid removing or filtering results by biasing results toward versions that correlate with what the customer is running, according to the stack trace or memory dump received from the customer.

The problem resolution manager 110 can also be applied in different scenarios for resolving customer problems. In one scenario, the problem resolution manager 110 identifies a problem, and implements the resolution automatically on behalf of the user, or as much of the resolution as can be accomplished automatically. In a second scenario, the problem resolution manager 110 assists in identifying or flagging problematic aspects, components, activities, or other facets of a software product. If a particular problem/algorithm pair is encountered frequently, the problem resolution manager 110 can alert software developers to the problematic components and provide associated detailed diagnostic data for debugging or resolving the issue. In a third scenario, the problem resolution manager 110 identifies a problem, and provides information about the resolution to the user so the user can solve the problem him or her self. These scenarios resolve the problem without any contact or involvement with a human support agent. However, this algorithmic approach to solving problems can also enhance the effectiveness and increase the efficiency of interactions with support agents.

In an example of enhancing interactions with human support agents, a customer opens a case, via telephone or the Internet, through conventional mechanisms or reporting an issue that the traditional support approaches are unable to resolve. As the user submits diagnostic data and other data about the case, the problem resolution manager 110 scans the incoming case data for potentially relevant diagnostic data. When relevant data is found, the problem resolution manager 110 translates the data into the same ordered set of resolution recommendation(s), and communicates the recommendation(s) to a human support technician, who communicates the recommendation(s) to the user throughout the problem life cycle. The human support technician can view an analysis of the data received about the customer's situation, and a knowledge base article, or other resource, that has a resolution for the customer's problem. The human support technician can thus rely on the algorithms while relying on his or her judgment whether a particular solution will resolve the customer's issue.

Solutions can be knowledge base articles that encapsulate problem solution knowledge in a standardized way. However, solutions can also include documents, internal or external web pages, forum posts, sets of steps, utilities, software updates, lists of software restrictions, system requirements, errata, mailing lists, a bug submission data store, and so forth. Solutions can include any resource which can be indexed and matched to a particular problem or problem type and which may improve the chance that the technician will be able to provide a faster resolution to a problem.

The problem resolution manager 110 can solve problems without fuzzy logic or any kind of machine learning technique without an understanding of what the algorithms do or an understanding of how the algorithms operate, other than the design of the algorithms, in that the algorithms are only used for comparison. The problem resolution manager does not necessarily know or understand rules about the data it's interacting with.

Figure 4:
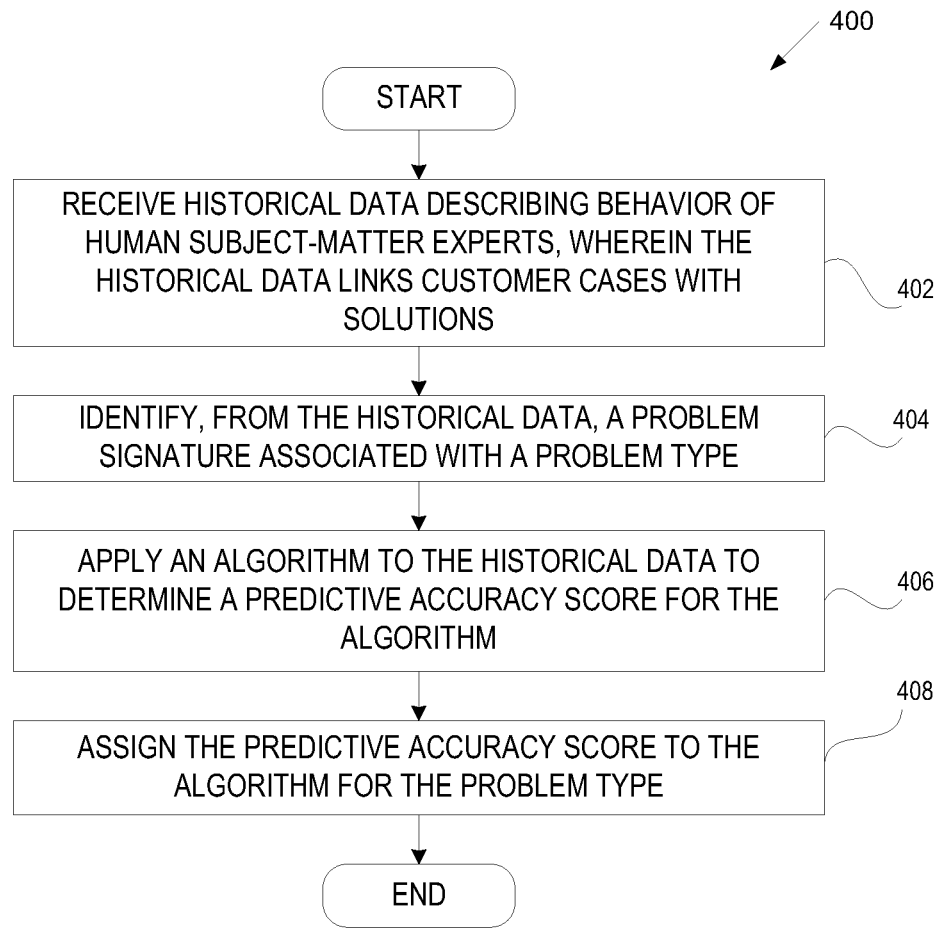
FIG. 4 illustrates a first example method embodiment for creating a predictive accuracy score for use in resolving customer problems.

FIG. 4 illustrates a first example method embodiment for creating a predictive accuracy score for use in resolving customer problems, as practiced by an exemplary system. The method 400 is performed by processing logic that may comprise hardware (circuitry, dedicated logic, etc.), software (such as is run on a general purpose computer system or a dedicated machine), or a combination of both. In one embodiment, the method is performed by a client device (e.g., the algorithm evaluator 212 of FIG. 2). The system receives historical data describing behavior of human subject-matter experts, wherein the historical data links customer cases with solutions (402). The historical data can be unstructured or structured data, such as a stack trace, a core file or core dump which represents the recorded state of the working memory of a computer program at a specific time (generally when a program has terminated abnormally or crashed)., a memory dump—define, or any other information associated with the customer problem.

The system identifies, from the historical data, a problem signature associated with a problem type (404). The problem signature is a particular set of attributes of the problem that define the problem type, or that define which algorithms would be best suited to correctly predict a resolution to the problem. The system can identify the problem signature by comparing each algorithm of a plurality of algorithms with the historical data, forming groups within the historical data based on a common problem signature, and comparing the historical data based on the groups.

The system applies an algorithm to the historical data to determine a predictive accuracy score for the algorithm (406). For example, the system can process data available for a particular problem with various algorithms, and analyze how closely the algorithms predictions matched what the human support engineer did to resolve the problem. A highly predictive score would match or closely match what the human support engineer did, while a less predictive score would either not match or not frequently match the human selected resolution. The system assigns the predictive accuracy score to the algorithm for the problem type (408). The system can further receive additional historical data, and upon determining that the additional historical data diverges at least a threshold distance from the historical data, update the predictive accuracy score based on the additional historical data. The threshold distance can be a difference between a vector of various data elements in the historical data and a vector of the additional data, for example. If the historical data has a consistent pattern of problem data, a new set of problems may have entirely different problem types, which would increase the distance, and can trigger updating the predictive accuracy score. One example cause of such a change could be a software update that resolves a previously encountered set of issues, but introduces other issues.

Alternately, the system can receive historical data describing behavior of human subject-matter experts, wherein the historical data links customer problems with solutions, and receive a plurality of human-generated algorithms describing patterns for linking customer problems with solutions based on problem-specific diagnostic data. Then the system can use each algorithm of the plurality of algorithms to process the historical data to determine respective predictive scores for linking a customer problem type with a particular solution, and rank at least part of the plurality of algorithms based on the respective similarity scores.

Figure 5:
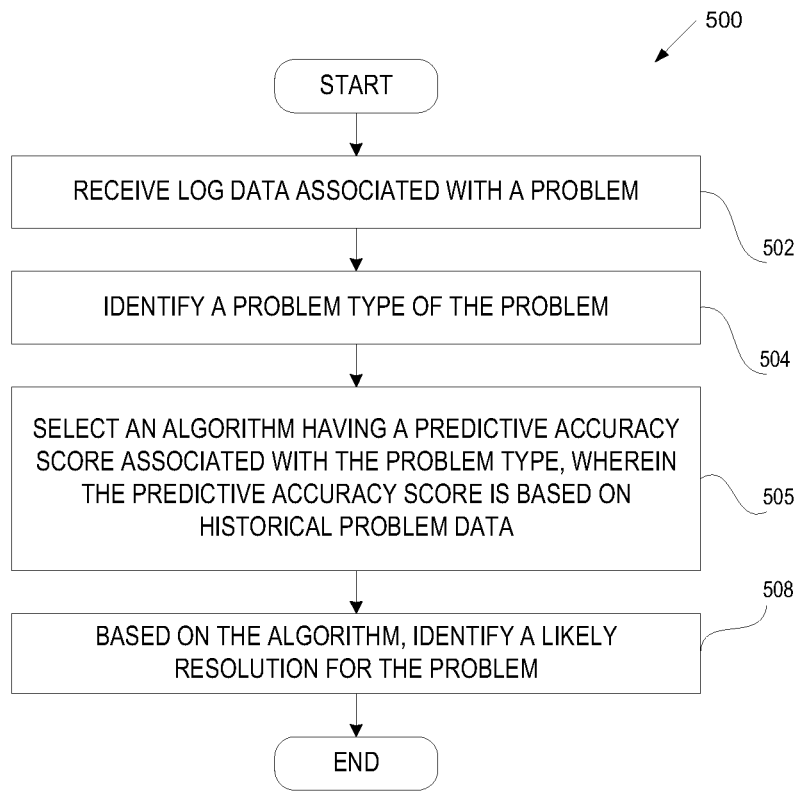
FIG. 5 illustrates a second example method embodiment for applying a predictive accuracy score to identify a problem resolution.

FIG. 5 illustrates a second example method embodiment for applying a predictive accuracy score to identify a problem resolution, as practiced by an exemplary system. The method 500 is performed by processing logic that may comprise hardware (circuitry, dedicated logic, etc.), software (such as is run on a general purpose computer system or a dedicated machine), or a combination of both. In one embodiment, the method is performed by a client device (e.g., the algorithm selector 214 of FIG. 2). The system receives log data associated with a problem (502), and uses the log data to identify a problem type of the problem (504). For example, the system can analyze the log data to find particular data points that indicate a particular problem type. For instance, the value at a specific memory location in a core dump could provide an indication of a problem type, or a log of what the program was doing prior to the crash can provide an indication of a problem type. The system selects an algorithm having a predictive accuracy score associated with the problem type, wherein the predictive accuracy score is based on historical problem data (506). The system can optionally identify a set of likely algorithms, from which the algorithm is selected based on linking behavior of subject-matter experts in resolving problems. Linking behavior describes the behavior of subject-matter experts in applying a solution from a particular resource in resolving a problem. Thus, one or more resource relied upon in resolving a customer's problem is considered 'linked' to that problem. The system can then bias the predictive accuracy score based on similarities of the historical data to an environment of the customer problem.

Based on the algorithm, the system identifies a likely resolution for the problem (508). The likely resolution may conform with a solution format defined by an external organization, such as the Consortium for Service Innovation. The likely resolution can be selected from a data store of knowledge base articles. The system can identify a top ranked resolution as the likely resolution, and perform an action or set of actions to resolve the customer problem based on the top ranked resolution. The system can implement at least part of the likely resolution to the problem via one or more approaches separately or in combination. For example, the system can transmit instructions to hardware or software on the user's device for resolving the problem. The system can implement server side modifications for a problem involving a server. The system can transmit a message or other information to the user or to a human support agent. If another piece of software is involved in or is causing the problem to manifest itself, the system can transmit instructions to the other piece of software, whether it be on the user's device or another device.

In the event that the system determines that the historical data has insufficient information to identify the problem type of the problem, the system can identify a second customer problem representing a second problem type that is similar to the problem type, and select the algorithm based on the second problem type. Even though the system may not have historical data or an algorithm that is exactly the same as the current problem, the system can attempt to adapt and use the most similar historical data and/or algorithm. Further, the system can log diagnostic information describing this problem so that a human can evaluate the problem and modify the algorithm or generate an entirely new algorithm.

In another embodiment, the system can receive diagnostic data associated with a customer problem and identify a problem type based on the diagnostic data. Then the system selects, based on the problem type, a plurality of algorithms, wherein the plurality of algorithms are selected based on historical data of human subject-matter experts linking customer problems with solutions. Based on the algorithms, the system can generate a ranked list of solutions to the customer problem, and output at least part of the ranked list of solutions.

Figure 6:
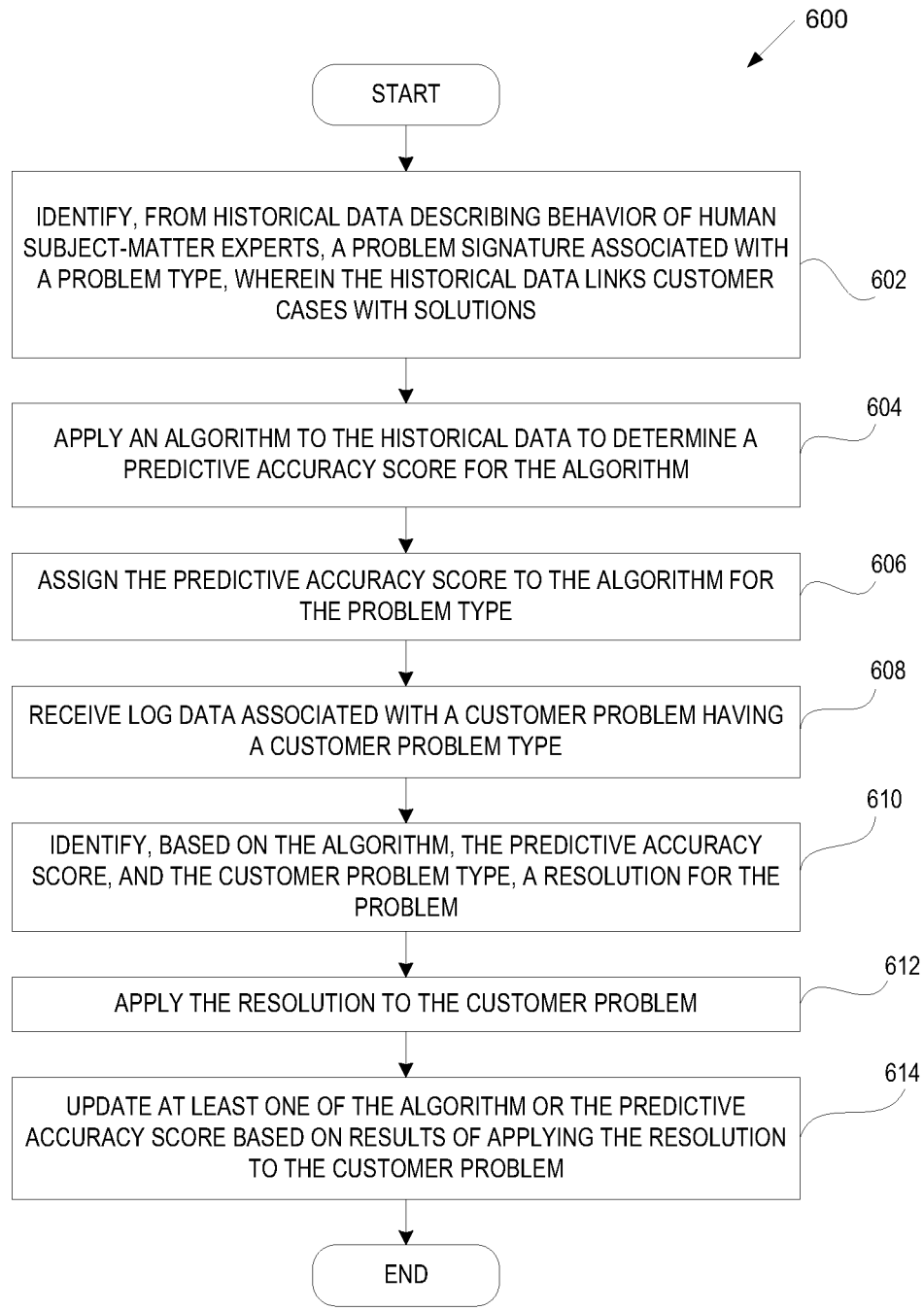
FIG. 6 illustrates a third example method embodiment for identifying a problem, resolving the problem, and updating problem resolution algorithms.

FIG. 6 illustrates a third example method embodiment for identifying a problem, resolving the problem, and updating problem resolution algorithms, as practiced by an exemplary system. The method 600 is performed by processing logic that may comprise hardware (circuitry, dedicated logic, etc.), software (such as is run on a general purpose computer system or a dedicated machine), or a combination of both. In one embodiment, the method is performed by a client device (e.g., the algorithm evaluator 212 of FIG. 2). The system identifies, from historical data describing behavior of human subject-matter experts, a problem signature associated with a problem type, wherein the historical data links customer cases with solutions (602). The behavior of subject matter experts can be from successful and/or unsuccessful problem resolution attempts. The behavior can include linking a particular solution with a particular problem or problem type, and can also include a list of solutions attempted which did not resolve the problem or which did not initially resolve the problem, as well as combinations of solutions which were applied together. The system can filter the historical data based on the customer problem type.

The system applies an algorithm to the historical data to determine a predictive accuracy score for the algorithm (604). In this way, the system tests how closely the algorithm matches the observed successful behavior of the subject matter experts. Algorithms that closely match the observed behavior of subject matter experts are determined to have a high predictive accuracy score, while algorithms that do not match or do not closely match the observed behavior of subject matter experts are determined to have a low predictive accuracy score. The system then assigns the predictive accuracy score to the algorithm for the problem type (606).

The system receives log data associated with a customer problem having a customer problem type (608). The log data can be received via a network from an automatic reporting mechanism operating on a customer computing device. An aggregator can receive log data and communicate with the system on behalf of the customer computing device. The system identifies a resolution for the problem based on the algorithm, the predictive accuracy score, and the customer problem type, and optionally on a predictive accuracy threshold (610).

The system applies the resolution to the customer problem (612). Applying the resolution to the customer problem can include at least one of presenting the resolution to a human problem resolution agent, presenting the resolution to a customer, and implementing at least part of the resolution via a customer computing device. Further, as the system applies the resolution and obtains feedback from the user and/or the user's device or software, the system can track a success rate of the resolution and consequently update a data store of resolutions based on the success rate or any other data associated with that problem type or resolution. The system can further update at least one of the algorithm or the predictive accuracy score based on results of applying the resolution to the customer problem (614).

In an alternate embodiment, the system can identify an agent assisting a customer to resolve a problem and receive diagnostic data associated with the problem. The system can process the diagnostic data, via a plurality of algorithms generated based on historical data of human subject-matter experts linking customer problems with solutions, to yield a ranked list of solutions to the problem, and provide the ranked list of solutions to the agent. The algorithms, solutions, predictive accuracy scores, and so forth can be applied in customer problem analytics, human agent training, a troubleshooting recommendation engine, or other educational purposes. One positive aspect of this system is that it can learn from previous expert behavior.

The approaches set forth herein can help eliminate or reduce the volume of contacts to support technicians for solving repetitive problems. This approach may be less useful for solving problems that have never occurred before or for solving problems for which the data store does not have a record of a successful expert interaction because it's not rule-based and doesn't deeply understand the data it is processing.

Besides problems that occur over and over again year after year, a smaller case load of a same problem may tend to occur in chunks or clusters where a large number of customers report a same problem over a period of a week or a month, then the problem goes away and is not encountered again. One example of such a cluster of problems is when an infrastructure problem causes a time-based clumping of a novel problem. In another such example, when a new product ships with issues, the support provider does not have resolutions immediately, but the data store will spike shortly after release. The resolution process can be expedited by inferring relationships between these cases and letting the support engineers know about it. In another such example, a software patch, update, or fix is issued for one set of problems to one part of a software product, and that fix exposes or produces problems in another part of our product. The release of the fix very quickly causes or exposes other problems, which are reported shortly thereafter.

The system can determine that this previously encountered problem has a similar problem signature to another problem, even though the system doesn't know the common dysfunction to either of them, the information and algorithms selected can speed up support delivery and either automatic problem resolution or human-assisted problem resolution.

The system can also relate problem cases to other problems. If the system does not have to have a solution to a particular problem, a human can use the information available to the system to expedite the resolution process. Then, when the problem is resolved, the data store and algorithms can be updated so that the information propagates to others, including those who report the problem after that.

Figure 7:
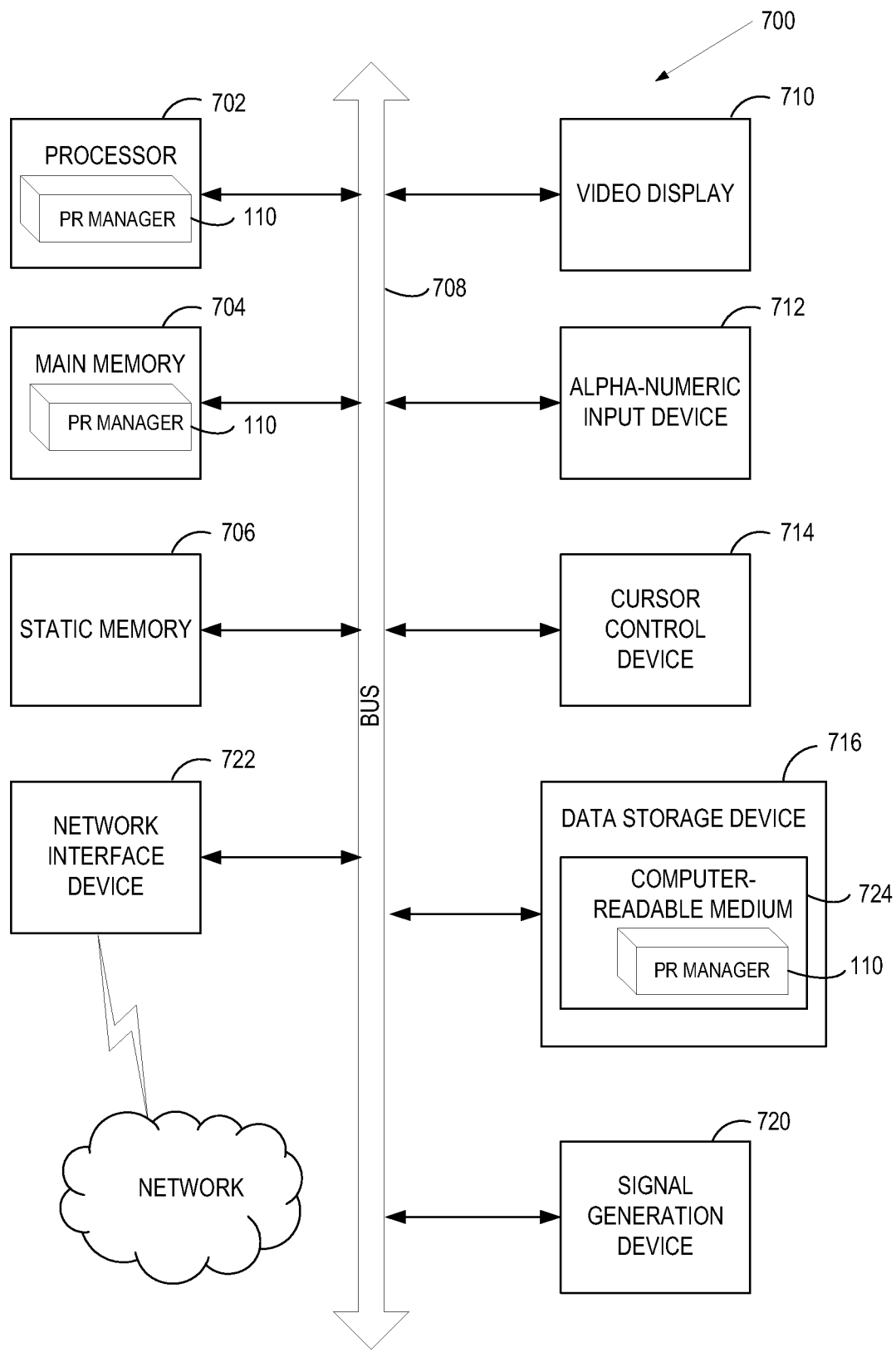
FIG. 7 illustrates a block diagram of an exemplary computer system, in accordance with one embodiment of the present invention.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute processing logic (e.g., instructions 726) for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), other user input device such as a touch screen or a microphone, and a signal generation device 720 (e.g., a speaker).

The secondary memory 718 may include a machine-readable storage medium (or more specifically a computer-readable storage medium) 724 on which is stored one or more sets of instructions 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

The computer-readable storage medium 724 may also be used to store a problem resolution manager which may correspond to the problem resolution manager 110 of FIG. 1), and/or a software library containing methods that call a problem resolution manager 110. While the computer-readable storage medium 724 is shown in an exemplary embodiment to be a single medium, the term "computer-readable storage medium" should be taken to include a single medium or multiple media (e.g., a centralized or distributed data store, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A method comprising:
receiving historical data, wherein the historical data describes behavior of human subject-matter experts, and wherein the historical data links customer cases with solutions, wherein the solutions are associated with a software product;
identifying, from the historical data, a problem signature associated with a problem type;
applying a process to the historical data to determine a predictive accuracy score for the process;
assigning the predictive accuracy score to the process for the problem type; and
identifying, in view of ranking at least part of a plurality of processes and a reporting threshold, a portion of the software product as having a problem.

2. The method of claim 1, wherein the historical data is structured data comprises at least one of a stack trace, a core file, or a memory dump.

3. The method of claim 1, further comprising:
receiving additional historical data; and
upon determining that the additional historical data diverges at least a threshold distance from the historical data, updating the predictive accuracy score in view of the additional historical data.

4. The method of claim 1, wherein identifying the problem signature further comprises:
comparing each process of a plurality of processes with the historical data;
forming groups within the historical data in view of a common problem signature; and
comparing the historical data in view of the groups.

5. A system comprising:
a processing device;
a memory having stored therein instructions which, when executed by the processing device, cause the processing device to:
receive log data associated with a problem;
identify a problem type of the problem;
select a process having a predictive accuracy score associated with the problem type, wherein the predictive accuracy score is in view of historical data, wherein the historical data describes behavior of human subject-matter experts, wherein the historical data links customer cases with solutions, wherein the solutions are associated with a software product;
in view of the process, identify a likely resolution for the problem; and
identify, in view of a rank of at least part of a plurality of processes and a reporting threshold, a portion of the software product as having a problem.

6. The system of claim 5, wherein the instructions, when executed by the processing device, further cause the processing device to:
bias the predictive accuracy score in view of similarities of the historical data to an environment of the problem.

7. The system of claim 5, wherein the instructions, when executed by the processing device, further cause the processing device to:
identify a top ranked resolution as the likely resolution; and
perform an action to resolve the problem in view of the top ranked resolution.

8. The system of claim 5, wherein the likely resolution is selected from a data store of knowledge base articles.

9. The system of claim 5, wherein the instructions, when executed by the processing device, further cause the processing device to:
determine that the historical data has insufficient information to identify the problem type of the problem;
identify a second problem representing a second problem type that is similar to the problem type; and
select the process in view of the second problem type.

10. The system of claim 5, wherein the likely resolution conforms with a solution format defined by an external organization.

11. The system of claim 5, wherein the instructions, when executed by the processing device, further cause the processing device to:
identify likely processes, from which the process is selected, in view of linking behavior of subject-matter experts in resolving problems.

12. The system of claim 5, wherein the instructions, when executed by the processing device, further cause the processing device to:
implement at least part of the likely resolution for the problem.

13. A non-transitory computer-readable storage medium having stored therein instructions which, when executed by a processing device, cause the processing device to:
identify, by the processing device, from historical data comprising, wherein the historical data describes behavior of human subject-matter experts, a problem signature associated with a problem type, wherein the historical data links customer cases with solutions, wherein the solutions are associated with a software product;
apply a process to the historical data to determine a predictive accuracy score for the process;
assign the predictive accuracy score to the process for the problem type;
receive log data associated with a problem having a problem type;
identify, in view of the process, the predictive accuracy score, and the problem type, a
resolution for the problem;
apply the resolution to the problem;

update at least one of the process or the predictive accuracy score in view of results of applying the resolution to the problem and identify, in view of a rank of at least part of a plurality of processes and a reporting threshold, a portion of the software product as having a problem.

14. The non-transitory computer-readable storage medium of claim 13, the instructions, when executed by the processing device, further causing the processing device to:

track a success rate of the resolution; and update a data store of resolutions in view of the success rate.

15. The non-transitory computer-readable storage medium of claim 13, wherein apply the resolution to the problem comprises at least one of present the resolution to a human problem resolution agent, present the resolution to a customer, or implement at least part of the resolution via a customer computing device.

16. The non-transitory computer-readable storage medium of claim 13, wherein the log data is received via a network from an automatic reporting mechanism operating on a customer computing device.

17. The non-transitory computer-readable storage medium of claim 13, the instructions, when executed by the processing device, further causing the processing device to:

filter the historical data in view of the problem type.

18. The non-transitory computer-readable storage medium of claim 13, wherein identify the resolution is further in view of a predictive accuracy threshold.

* * * * *